United States Patent
Saurenman et al.

[15] 3,696,791
[45] Oct. 10, 1972

[54] POULTRY GROWTH ENHANCEMENT METHOD AND APPARATUS

[72] Inventors: Donald G. Saurenman, Whittier; Harold W. Smith, San Marino, both of Calif.

[73] Assignee: Consan Pacific Incorporated, Whittier, Calif.

[22] Filed: April 12, 1971

[21] Appl. No.: 133,076

[52] U.S. Cl. .................................................119/21
[51] Int. Cl. ..............................................A01k 31/00
[58] Field of Search ............119/18, 21, 37; 128/190; 317/2, 4, 262 AE; 21/74 A; 204/176, 313, 316, 319

[56] References Cited

UNITED STATES PATENTS

| | | | |
|---|---|---|---|
| 3,396,703 | 8/1968 | Trussell | 119/37 X |
| 3,311,108 | 3/1967 | Cristofv et al. | 128/190 |
| 2,264,495 | 12/1941 | Wilner | 317/4 |
| 2,043,217 | 6/1936 | Yaglou | 21/74 A |
| 3,483,672 | 12/1969 | Jahnke | 128/190 X |
| 3,308,344 | 3/1967 | Smith et al. | 317/2 F |

*Primary Examiner*—Hugh R. Chamblee
*Attorney*—White, Haefliger & Bachand

[57] ABSTRACT

A method of benefitting animals in a zone which characteristically contains air-borne particles includes:
a. confining the animals in the zone, and
b. dispensing ions into the zone with ion density and polarity to induce collection of the air-borne particles on collection surfaces in the zone.

14 Claims, 3 Drawing Figures

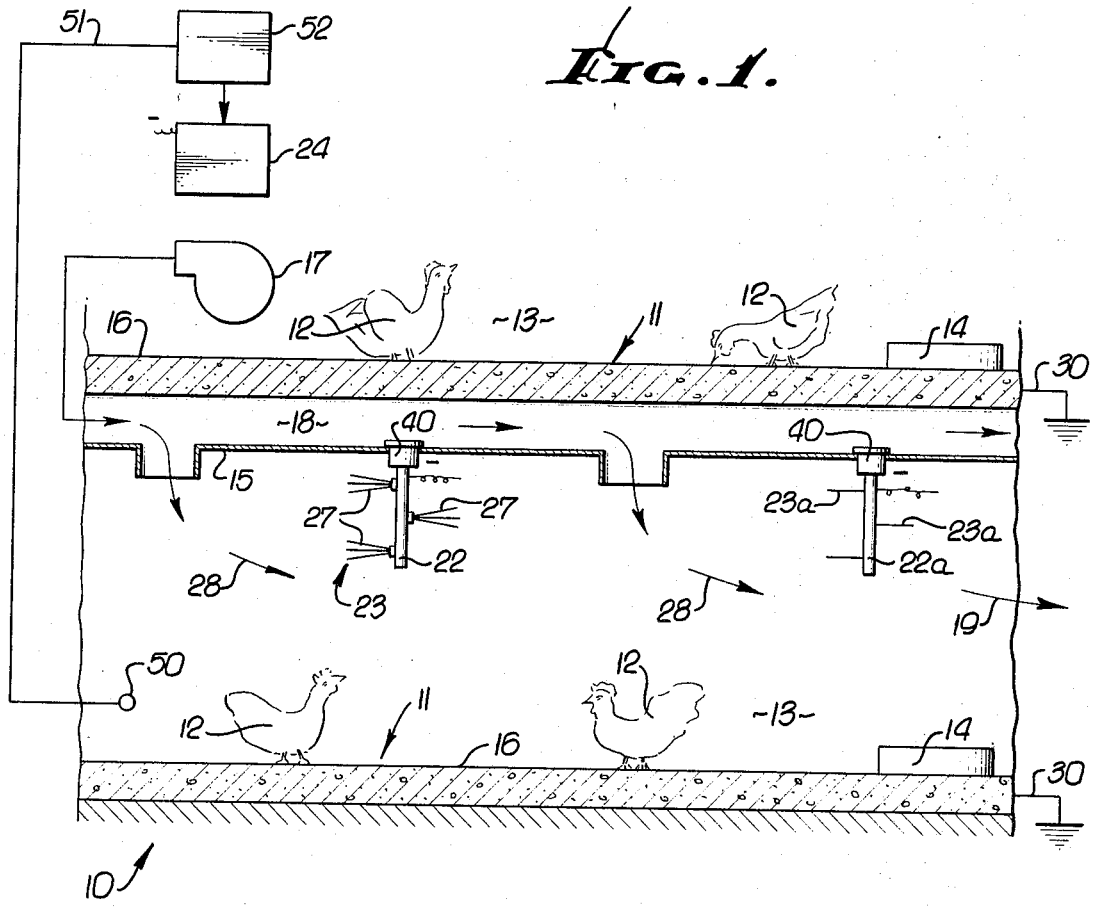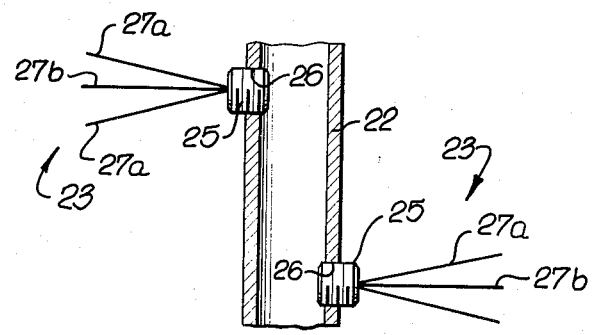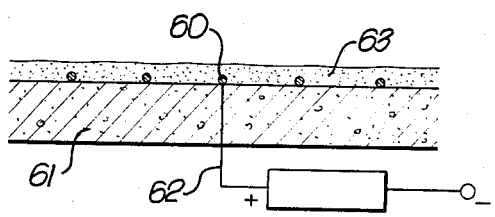

POULTRY GROWTH ENHANCEMENT METHOD AND APPARATUS

BACKGROUND OF THE INVENTION

This invention relates generally to treatment of animals, and more particularly concerns the enhancement of animal growth through reduction in air-borne particulate and ammonia gas and odors in feeding enclosures.

The feeding areas of animals, as for example, poultry (chicken, Turkey, ducks, etc.) are typically dusty due to the stirring up of dusty litter or droppings and feed particles. As a result, fowl become nervous or irritated as indicated by increased fluttering, they tend to consume less feed, lay fewer eggs and add less weight, creating an economic loss. Animals other than fowl are also affected in a similar manner.

This condition is further aggravated by the production of ammonia gas and odors formed by the action of micro-organisms on droppings and in litter on the floor, as well as dampness. At 15 p.p.m. ammonia gas in the air can be detected by humans; at 50 p.p.m. such gas becomes detrimental to poultry health; and the gas becomes toxic at 100 p.p.m. Ammonia gas concentration around poultry enclosures is often so high that it will cause tear production in human eyes. Many poultry houses are provided with air blowers to furnish up to 7 c.f.m. of moving air in order to keep the ammonia gas and odor level down. This involves considerable expense for blowers and their operation, as well as added heating of such blown air drawn from the outside during cold weather. While poultry is specifically mentioned, it will be understood that animals other than poultry are similarly affected.

SUMMARY OF THE INVENTION

It is a major object of the invention to provide method and apparatus for alleviating the above problems, so that animal health and weight and production may be substantially improved. Basically the invention contemplates the dispersing of ions into the animal feeding areas, with ion density and polarity to induce collection of air-borne dust and contaminants on particle collecting surfaces. Such particles, when charged negatively for example, settle much faster due to the positive earth charge acting on the collecting surfaces; and the consequent reduction of air-borne particulate including micro-organisms improves animal health, reduces respiratory problems, and results in improved growth rates and weight factors. In addition, negative ions in the atmosphere are cidal to micro-organisms including those that induce generation of ammonia gas, and there is also found to be a reduction of detectable ammonia in the atmosphere by virtue of the presence of artificially produced air ions. Further, the need for ventilation and heating of blown air is reduced, with cost savings. In addition, there is a consequent reduction in condemnation of animals (as for example poultry) procured for the market due to lesser disease incidence. In the feeding enclosures, nervousness is reduced and food conversion ratios are improved.

Additional objects include the provision of ion dispensing means in the enclosures, as for example in the path of ventilation, such means including multiple pointed tips to which high voltage is supplied These and other objects and advantages of the invention, as well as the details of illustrative embodiments, will be more fully understood from the following description and drawings, in which:

DRAWING DESCRIPTION

FIG. 1 is a side elevation of a poultry enclosure;
FIG. 2 is an enlarged elevation showing one form of ion dispensing means; and
FIG. 3 illustrates modified charged particle attractor.

DETAILED DESCRIPTION

In the drawing, a poultry enclosure 10 contains decks 11 between which growing poultry 12 are kept in feeding zones 13, with access to feed in containers 14. This particular arrangement is illustrative only, and many different enclosures and feeding systems may be used, and for animals other than poultry.

The feeding zones characteristically contain airborne particulate matter, and there are particle collecting surfaces as at 15 and 16 exposed to the zone interiors. As stated, the presence of such air-borne particulate matter, stirred by movement of the poultry (or other animals) and by moving air, is hazardous and inhibits poultry growth and production. In this regard, ammonia gas and odor generated by droppings and urine is a further health hazard, and air blower 17 is operative to displace air currents via overhead ducting 18 into the zones 13 in an effort to remove such gas from zones 13; however, such flowing air stirs up dust particles as may originate from the environment and in the feed, further aggravating that source of irritation. Air streams leaving the enclosure via suitable outlets are indicated at 19.

In accordance with the invention, ions are dispensed into the zones 13 and with density and polarity to induce collection of the air-borne particles on the collecting surfaces. In addition, the dispensing step may be carried out to travel the ions into contact with air-borne micro-organisms and droppings or contaminants in the zone, thereby to inhibit ammonia generation and diffusion. Means to dispense ions may advantageously comprise an elongated member such as is seen at 22, together with one or more groups 23 of pointed tips 24 to which high voltage is supplied. In this regard, member 22 may be electrically conductive, and supplied with high voltage from source 24.

In FIG. 2, inserts 25 carry the clusters or groups 23, and are threaded into tapped openings 26. Each cluster 23 may include multiple needles 27a clustered about an axis defining central needle 27b. Members 22 may be suspended overhead, as shown, in the paths of air streams 28 so that negative ions produced at the needle tips by corona effect are electrically repulsed and travel divergently outwardly into the air. One useful circuit to provide the source 24 is described in U.S. Pat. No. 3,308,344. The decks 11 are grounded (i.e., made electrically positive) at 30, whereby negatively charged dust particles and micro-organisms are electrostatically attracted to deck surfaces. FIG. 1 also shows a conductive member 22a to which single needles 23a are connected to dispense charge. Insulators 40 support members 22.

As stated in the introduction, negative ions not only act to substantially reduce (by settling) the air-borne particulate matter including micro-organisms, but they also are believed to cause celia in the poultry breathing organs to operate efficiently thus causing the respiratory system to better filter out any particulate matter and micro-organisms remaining in the air. This also improves poultry (or animal) health.

An increase in poultry feeding to gain full size within six weeks rather than the normal eight weeks was achieved after use of the ion dispensing means and method described, with about 2,000 static volts maintained in the air at 13, all other conditions remaining the same before and after inclusion of the ion dispensers. Higher static volt levels, say up to 4,000 or 5,000 produce even better results in terms of rate of weight gain. Good results are obtainable with negative supply voltages between −500 and −18,000 or above. Another beneficial result is a reduction in the amount of the blown air needed to remove ammonia gas. It was also found that good results were obtained when voltage delivery to the needles, i.e., ion production, was intermittent, i.e., several time periods "on," several periods etc. "off," etc. We have found that negative ions produce the best results but both negative and positive ions may be dispensed, with negative ions predominating.

FIG. 1 also shows a static voltage sensor 50 in zone 13, and connected in feed-back relation at 51 to a control device 52 for the voltage generator 24, and operating to control the voltage level or "on-off" or other output parameter of 24 so as to maintain desired static voltage level at 13.

It is contemplated that the invention will also have application to veterinary hospitals and animal treatment enclosures, to decrease animal nervousness, and improved health due to reduced particulate and micro-organisms in the air.

FIG. 3 shows a conductive grid 60 or other device or layer on the enclosure floor 61, that grid being charged positively at 62 to aid in attraction of particles to the floor. Sand in a layer 63 may cover the grid, as shown.

We claim:

1. The method of benefitting animals in a zone which characteristically contains air-borne particles and there being particle collecting surfaces exposed to the zone interior, the method utilizing ion producing tip means to which high voltage is supplied, and including
   a. confining the animals in said zone, and
   b. dispensing ions into said zone with ion density and polarity to induce collection of the air-borne particles on said surfaces,
   c. said dispensing step being carried out by orienting the tip means in openly exposed relation to the animals and animal waste in said zone to direct the ions into such proximity with said animal waste as to inhibit ammonia diffusion from said waste into said zone.

2. The method of claim 1 wherein the animals comprise poultry, and said confining step is carried out to confine the poultry beneath the level of said tips.

3. The method of claim 1 wherein said dispensing step is carried out to maintain an above normal static volt level in the air around the animals.

4. The method of benefitting animals in a zone which characteristically contains air-borne particles and there being particle collecting surfaces exposed to the zone interior, the method including
   a. confining the animals in said zone,
   b. dispensing ions into said zone with ion density and polarity to induce collection of the air-borne particles on said surfaces,
   c. said dispensing step being carried out to direct the ions into such proximity with animal waste in said zone as to inhibit ammonia diffusion from said waste into said zone, and to maintain an above normal static volt level in the air around the animals, and
   e. sensing the static volt level and controlling said level in response to said sensing.

5. Animal benefitting apparatus, comprising in combination
   a. means forming an animal confinement zone which characteristically contains air-borne particles and there being particle collecting surfaces exposed to the zone interior, said zone containing animals, and
   b. other means for dispensing ions into said zone with ion density and polarity to induce collection of the air-borne particles on said surfaces, said other means directly and openly exposed to the animals and to animal waste in said zone, said other means comprising multiple pointed tips to which high voltage is supplied, the tips oriented to dispense ions into such proximity with animal waste in said zone as to inhibit ammonia diffusion from said waste into said zone.

6. The apparatus of claim 5 including a source of said high voltage connected with said tips.

7. The combination of claim 6 wherein said source is D. C. negative.

8. The combination of claim 5 wherein said other means comprises an elongated electrically conductive member, and multiple pointed tips electrically connected to said member.

9. The combination of claim 5 including blower means and ducting to blow air through said zone interior, the ion dispensing means located to dispense ions into the air flowing in said zone.

10. The combination of claim 7 wherein said source supplies high negative voltage sufficient to increase the static voltage level in the air around the animals.

11. The combination of claim 10 including means to sense the static voltage level in said zone and to control said source in response to said sensing.

12. The combination of claim 10 including electrically conductive structure under the animal zone and of polarity to attract particles to which ion charge is imparted.

13. The method of improving animal health, and utilizing multiple pointed tips to which high voltage is supplied, which includes:
   a. confining the animals in a zone, and
   b. dispersing sufficient negative ions into the air around the animals and animal wastes to raise the static volt level in said zone, inhibit ammonia diffusion into said zone from animal waste, and induce collection of air-borne particles on surfaces exposed to the zone interior,
   c. said dispersing step being carried out by orienting the tips in openly exposed relation to the animals to direct the ions into proximity to said waste.

14. The method of benefitting animals confined in a manner characterized in that animal waste collects in a zone to produce ammonia diffusing toward the animals, there being air-borne particles and particle collecting surface means in said zone, the method utilizing pointed tip means to which high voltage is supplied to produce ions, the steps that include a. dispersing said ions so as to inhibit said ammonia diffusion and to include collection of the air-borne particles on said surface means, b. said dispersing step carried out by orienting the tip means in openly exposed relation to the collected animal waste to direct the ions into proximity to said waste.

* * * * *